US012809763B1

(12) United States Patent
Prakashbhai et al.

(10) Patent No.: US 12,809,763 B1
(45) Date of Patent: Nov. 24, 2026

(54) METHOD AND ARCHITECTURE FOR SELF-CLEARING FIRST-IN-FIRST-OUT (FIFO) RECEIVER CIRCUIT

(71) Applicant: Cadence Design Systems, Inc., San Jose, CA (US)

(72) Inventors: Parekh Jigar Prakashbhai, Bengaluru (IN); Ashish Agrawal, Bangalore (IN); Vikas Kumar Agrawal, Bangalore (IN)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 19/053,602

(22) Filed: Feb. 14, 2025

(51) Int. Cl.
*G06F 12/08* (2016.01)
*G06F 12/02* (2006.01)
*G06F 12/0808* (2016.01)
*G06F 12/0815* (2016.01)

(52) U.S. Cl.
CPC .. *G06F 12/0223* (2013.01); *G06F 2212/1024* (2013.01)

(58) Field of Classification Search
CPC ..... G06F 3/0613; G06F 3/0659; G06F 3/0679
USPC .......................................................... 711/154
See application file for complete search history.

(56) References Cited

U.S. PATENT DOCUMENTS

2008/0195774 A1 * 8/2008 Lemke ................ G06F 13/4059 710/57
2021/0157750 A1 * 5/2021 Zlotnik ............... G06F 13/1605

* cited by examiner

*Primary Examiner* — Mohamed M Gebril
(74) *Attorney, Agent, or Firm* — Mark H. Whittenberger; Holland & Knight LLP

(57) ABSTRACT

Embodiments are directed toward a method and architecture for asynchronously clearing a first-in-first-out (FIFO) receiver circuit. The circuit may include a first FIFO storage buffer and a second FIFO storage buffer both configured to receive input signals tethered to a first clocking domain on a write side, where both the first FIFO storage buffer and the second FIFO storage buffer are tethered to a second clocking domain on a read side. The circuit may further include a write pointer operatively connected to both the first and second FIFO storage buffers, a read pointer operatively connected to both the first and second FIFO storage buffers, and a valid flag register configured to trigger a start in the first clocking domain when a bit is sampled and stored in the first FIFO storage buffer. The circuit may also include a FIFO reset logic configured to asynchronously reset both the write pointer and the valid flag register, and to synchronously reset the read pointer.

19 Claims, 7 Drawing Sheets

500

METHOD AND ARCHITECTURE FOR SELF-CLEARING FIRST-IN-FIRST-OUT (FIFO) RECEIVER CIRCUIT

FIELD OF INVENTION

The present disclosure relates to circuits and more particularly, to methods and architectures used to clear and resynchronize first-in-first-out (FIFO) storage buffers tethered to different clocking domains in a receiver circuit.

BACKGROUND AND DISCUSSION OF RELATED ART

In modern circuit design, low latency may be a critical benchmark when measuring the effectiveness and performance of a system's architecture. Receiver data interfaces (RDIs) may denote the point where data enters or exits the physical or logical layers of a receiver. Optimizing the latency measured between RDIs (RDI to RDI) may be considered the best way to ensure that a receiver architecture is able to support high-speed, high-efficiency communication for advanced systems like chiplets, AI accelerators, or memory subsystems. This may be especially true in the context of Universal Chiplet Interconnect Express (UCIE) receivers where the target latency is less than 2 nanoseconds from RDI to RDI. The UCIE specification aims to standardize high-performance die-to-die interconnections where individual silicon dies (semiconductor chips) may be connected to enable communication and data exchange between them within a larger integrated system. These interconnections may typically be used in advanced semiconductor packaging technologies, where multiple dies are combined to create high-performance, modular computing systems.

In UCIE systems data may often come from asynchronous clocking domains. Read and write pointers may be used to help handle crossing these asynchronous clocking domains by allowing asynchronous data storage and retrieval. However, crossing these asynchronous clocking domains may cause an overflow to occur such that the write pointer "laps" the read pointer, meaning new data overwrites unread data. Alternatively, crossing these asynchronous clocking domains may cause an underflow to occur such that the read pointer may try to access a location that the write pointer has not yet filled (e.g. a FIFO empty buffer). In the context of FIFO buffers, write pointers may be used to track where new data is written in the FIFO buffer, and read pointers may be used to track where data is consumed. Together, read and write pointers may be used to ensure smooth operation between asynchronous components and to prevent buffer overflows or underflows. In either case, the most straightforward way to avoid complications when crossing these asynchronous clocking domains may be to reduce the latency measured between RDIs.

SUMMARY

In one or more embodiments of the present disclosure, a self-clearing first-in-first-out (FIFO) receiver circuit is provided. The circuit may include a first FIFO storage buffer and a second FIFO storage buffer where both may be configured to receive input signals tethered to a first clocking domain on a write side, and where both the first FIFO storage buffer and the second FIFO storage buffer may be tethered to a second clocking domain on a read side. The circuit may further include a write pointer operatively connected to both the first and second FIFO storage buffers, a read pointer operatively connected to both the first and second FIFO storage buffers, and a valid flag register configured to trigger a start in the first clocking domain when a bit is sampled and stored in the first FIFO storage buffer. The circuit may also include a FIFO reset logic configured to asynchronously reset both the write pointer and the valid flag register, and to synchronously reset the read pointer.

One or more of the following features may be included. The write pointer may be configured to keep track of which data slot is to be written to in an upcoming clock cycle for both the first and second FIFO storage buffers. The read pointer may be configured to keep track of which data slot is to be read from in a current clock cycle for both the first and second FIFO storage buffers. The first FIFO storage buffer may be configured to hold a first set of data slots for valid data, and the second FIFO storage buffer may be configured to hold a second set of data slots for raw data. The number of data slots held in the first set of data slots for the first FIFO storage buffer may be greater than the number of data slots held in the second set of data slots for the second FIFO storage buffer. The valid flag register may be configured to increment the write pointer to an available data slot in the first FIFO storage buffer. The circuit may further include a frame checker logic configured to receive an output from the first FIFO storage buffer and to confirm that the output from the first FIFO storage buffer is valid data, and a flop delay logic configured to synchronize signals transmitted in the first clocking domain with signals transmitted in the second clocking domain. The flop delay logic may include a flop synchronizer and a variable number of delay stages configured to vary based on current operating data rates. The number of delay stages may be varied to ensure that both the first and second FIFO storage buffers always have at least one stable data slot available to read/write. The flop delay logic may be configured to increment the read pointer from a previously selected data slot in the first FIFO storage buffer to another available data slot in the first FIFO storage buffer. The first FIFO storage buffer may be configured to selectively operate in a clock strobe mode, where when operating in clock strobe mode the first clocking domain may be selectively stopped such that no data is transmitted and the write pointer may be not incremented in the first FIFO storage buffer. Furthermore, while in clock strobe mode data may continue to be transmitted in the second clocking domain and both the read pointer and the write pointer may continue to increment through data slots in the second FIFO storage buffer. The circuit may further include a FIFO location clear logic configured to clear each previously selected data slot in the first FIFO storage buffer after the read pointer is incremented to another available data slot in the first FIFO storage buffer. The FIFO location clear logic may only be enabled while the first FIFO storage buffer is operating in the clock strobe mode.

In one or more embodiments of the present disclosure, a method for self-clearing first-in-first-out (FIFO) storage buffers in a receiver circuit is provided. The method may include receiving identical input data signals at a first FIFO storage buffer and at a second FIFO storage buffer, where both the first FIFO storage buffer and the second FIFO storage buffer are configured to receive input signals tethered to a first clocking domain on a write side, and where both the first FIFO storage buffer and the second FIFO storage buffer may be tethered to a second clocking domain on a read side. The method may further include sampling a bit from the input signal, storing the sampled bit in a selected data slot in the first FIFO storage buffer, and setting a valid flag register to trigger a start in the first clocking domain. In response to stopping the first clocking domain, the method may also include incrementing a write pointer from the previously selected data slot to another available data slot in the first FIFO storage buffer, and in response to incrementing the write pointer to another available data slot in the first FIFO storage buffer, clearing data from the previously selected data slot in the first FIFO storage buffer. The method may also include asynchronously resetting both the write pointer and the valid flag register, and synchronously resetting a read pointer when a read pointer is a predetermined number of clock cycles ahead of the write pointer in the second clocking domain.

One or more of the following features may be included. The first FIFO storage buffer may be configured to hold a first set of data slots for valid data, and the second FIFO storage buffer may be configured to hold a second set of data slots for raw data. No data may be transmitted and the write pointer may be not incremented in the first FIFO storage buffer when the first clocking domain is stopped. A read pointer may be configured to continuously increment through the first set of data slots in the first FIFO storage buffer until the read pointer is less than the predetermined number of clock cycles ahead of the write pointer in the second clocking domain. A FIFO location clear logic may be configured to clear each previously selected data slot in the first FIFO storage buffer after the read pointer is incremented to another available data slot in the first FIFO storage buffer. The method may further include synchronizing a write pointer location in the second clocking domain based on a triggering signal from a valid register, converting the write pointer location to a binary signal, and calculating a number of clock cycles between a read pointer location in the first clocking domain and the converted binary write pointer location in the second clocking domain. The method may also include determining if the read pointer location in the first clocking domain is less than the predetermined number of clock cycles ahead of the converted binary write pointer location in the second clocking domain, and in response to determining that the read pointer location in the first clocking domain is less than the predetermined number of clock cycles ahead of the converted binary write pointer location in the second clocking domain, stopping the incrementation of the read pointer through the first set of data slots in the first FIFO storage buffer.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

As was previously mentioned, low latency may be considered a critically important component in the UCIe standards for data transmission and the target latency measured between RDIs (RDI to RDI) may be less than 2 nanoseconds. In this context, a typical RDI to RDI may include a transmitter digital data path, analog serializer, analog deserializer, and digital receiver data path that may need to convert data from a received clock (RXCLK) to a local clock (LCLK). To provide a frame of reference, compared to a typical clock cycle of 500 ps, the 2 ns upper limit required by the UCIe standard may be equivalent to a mere 4 clock cycles. As such, every cycle reduction may bring the RDI to RDI timing closer to compliance with the UCIe target latency of 2 ns. Additionally, a major component to be considered in digital latency may be the synchronization between clocks at the receiver side. Latency at the transmitter side may be handled by other means, such as manipulating clock alignment between input clock and local clock using phase interpolator, which may not be available for the receiver side due to higher power consumption and other issues, therefore asynchronous FIFO may be a necessary component in order to achieve the UCIe target latency.

Accordingly, the disclosure provided herein may focus on the optimization of the latency in asynchronous FIFO storage buffers on the receiver side where data may be converted from the received clock (RXCLK) domain to the local clock (LCLK) domain.

Figure 1:
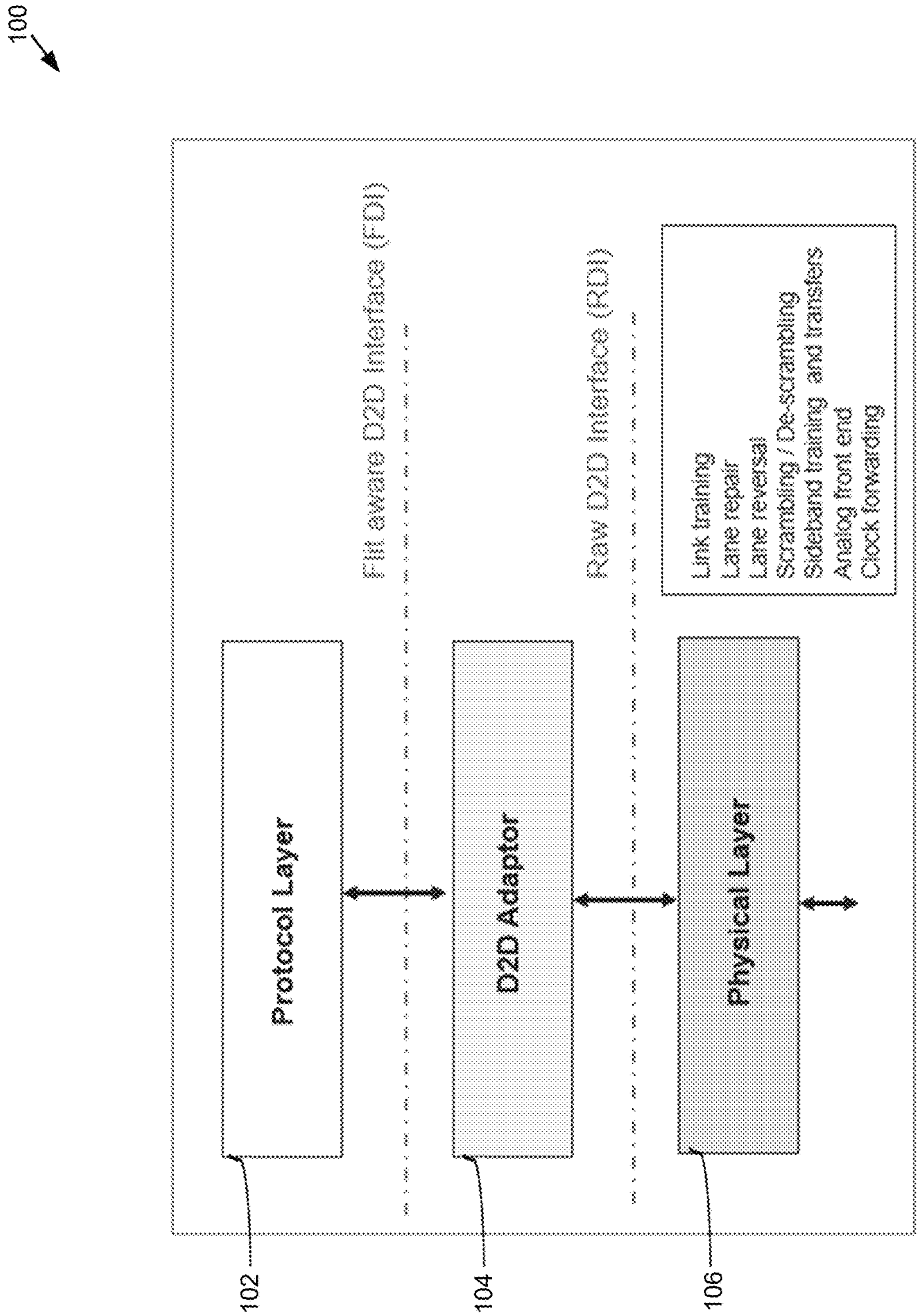
FIG. 1 shows a block diagram of the layers included in the universal chiplet interconnect express (UCIe) protocol consistent with current industry norms.
Figure 2:
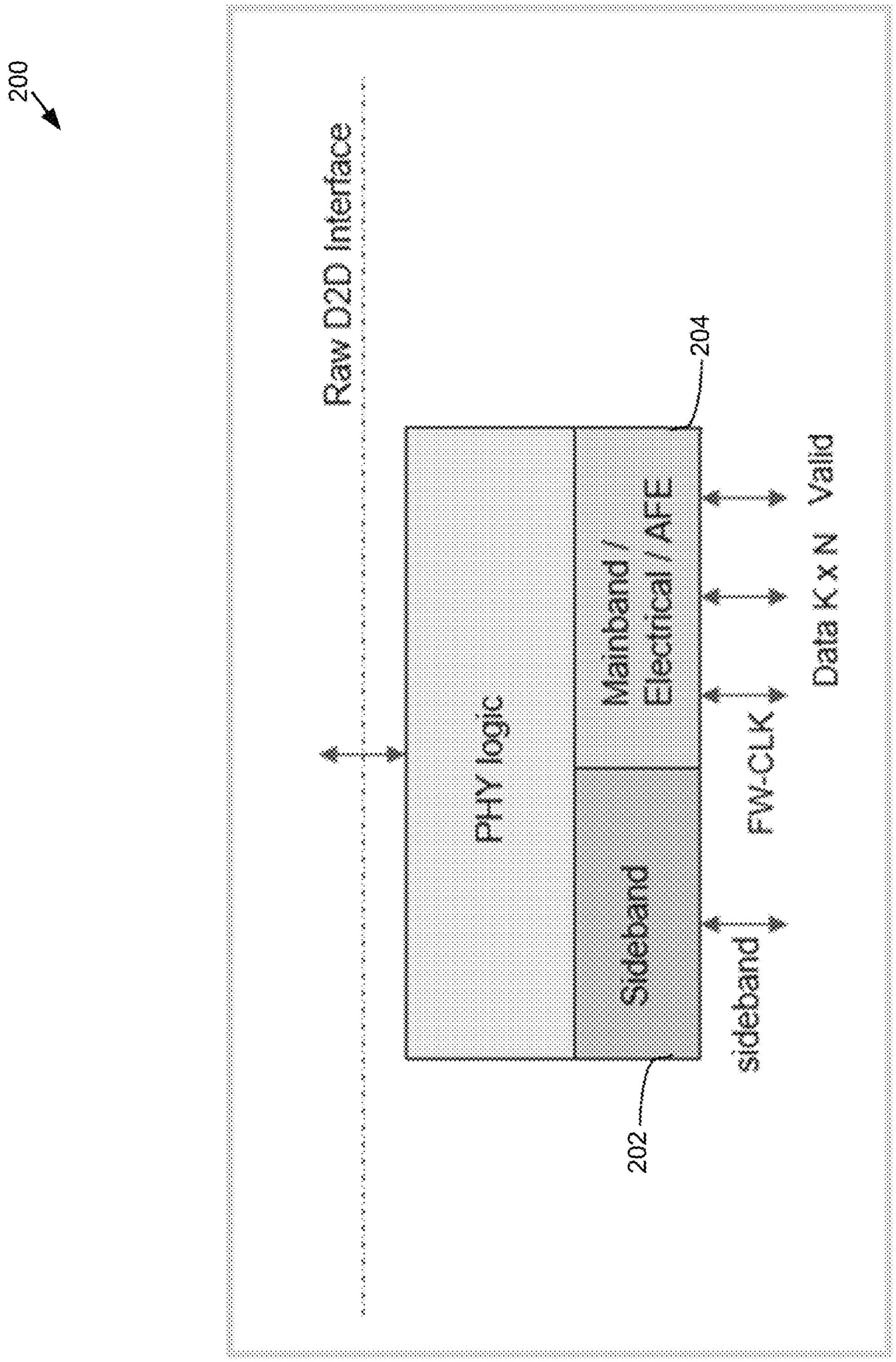
FIG. 2 shows a block diagram of the components included in the physical layer of the UCIe protocol consistent with current industry norms.

Referring now to FIGS. 1 and 2 protocol stack 100 and physical layer 200 are provided showing the layers included in the universal chiplet interconnect express (UCIe) protocol consistent with current industry norms and the components included in the physical layer of the UCIe protocol consistent with current industry norms. UCIe may be an open, multi-layer protocol, intended to connect multiple dies (semiconductor chips) on the same package. Here, the package may refer to the physical enclosure or assembly that houses the one or more semiconductor dies and serves as the interface between the dies inside and the external environment, such as a circuit board or other electronics. UCIe may include multiple functional layers that work together to facilitate communication between chiplets. Each layer in the UCIe protocol stack may be responsible for specific aspects of interconnection, allowing UCIe to provide a robust, scalable, and interoperable interface for chiplet-based systems.

As shown in FIG. 1, protocol stack 100 may include protocol layer 102, die-to-die (D2D) adapter layer 104, and physical layer 106, where protocol layer 102 may define high-level communication rules and data exchange protocols, D2D adapter layer 104 may manage error detection, flow control, and the efficient exchange of packets across the physical layer, and physical layer 106 may handle the electrical or physical transmission of data between chiplets.

Moreover, physical layer 200, as shown in FIG. 2 may include two connections sideband 202 and mainband 204, where sideband 202 may be used for parameter exchanges, register accesses for debug/compliance and co-ordination with remote partner for link training and management, and mainband 204 may serve as a data interface where actual data flow happens. Mainband 204 may further include a forwarded clock, a data-valid pin, and N Lanes of data per module.

Figure 3:
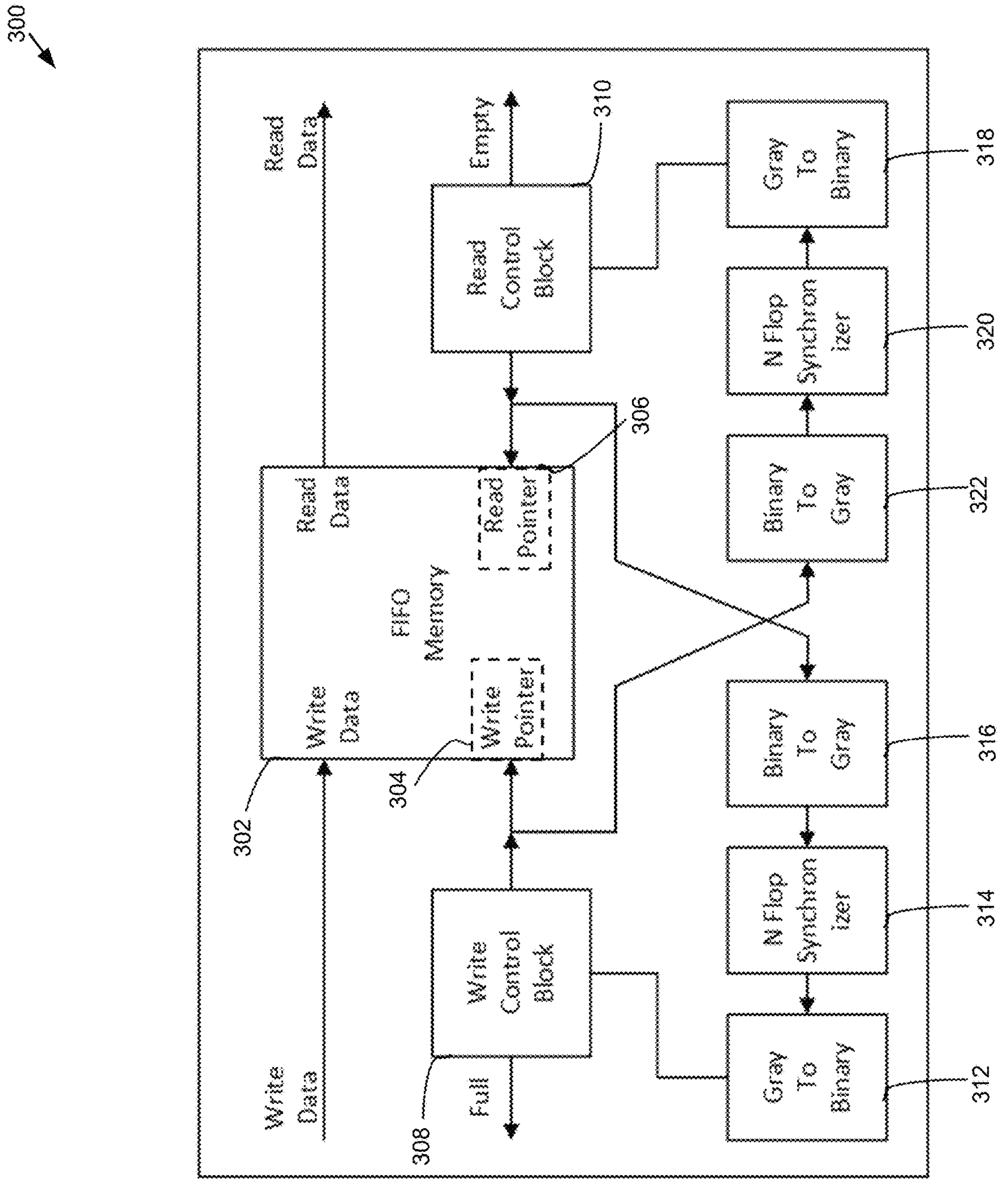
FIG. 3 shows an example of a conventional FIFO architecture consistent with embodiments of the present disclosure.

Referring now to FIG. 3, circuit 300 is provided showing an example of a conventional first-in-first-out (FIFO) architecture consistent with embodiments of the present disclosure. Circuit 300 may include FIFO storage buffer 302 which in turn may include write pointer 304 and read pointer 306. Write pointer 304 may be operatively connected to write control block 308, and together write pointer 304 and write control block 308 may be used to keep track of which data slot in FIFO storage buffer 302 may be written into next, in an upcoming clock cycle. Similarly, read pointer 306 may be operatively connected to read control block 310, and together read pointer 306 and read control block 310 may be used to keep track of which data slot is to be read from next, in the current clock cycle.

In some embodiments of FIFO memory systems, like circuit 300, write pointers and read pointers may often be incremented asynchronously (i.e., under separate clock domains). This may create a challenge when transferring these pointer values between domains because small timing mismatches (clock skews) may lead to incorrect interpretation of binary values. Gray code may be used to resolve this problem, because in gray code, only one bit may change at a time during transitions, thereby minimizing the chance of glitches or meta-stability issues when the data value may be sampled in the receiving domain. In contrast, binary values may have multiple bits changing simultaneously, thereby increasing the risk of error.

Accordingly, circuit 300 may also include first gray-to-binary converter 312, first N-flop synchronizer 314, and first binary-to-gray converter 316. First gray-to-binary converter 312 may be operatively connected to write control block 308, which in turn may be operatively connected to first N-flop synchronizer 314, which in turn may be operatively connected to first binary-to-gray converter 316. First binary-to-gray converter 316 may also be operatively connected to read control block 310 such that data output from read control block 310 may be converted from binary code to grey code before being converted back to binary and then being fed into write control block 308 to streamline the process of transferring read pointer data from a read clock domain into a write clock domain. During this conversion process first N-flop synchronizer 314 may be configured to ensure signal stability such that the read pointer signal data may be stable and synchronized with the destination write clock domain.

Correspondingly, circuit 300 may also include second gray-to-binary converter 318, second N-flop synchronizer 320, and second binary-to-gray converter 322. Second gray-to-binary converter 318 may be operatively connected to read control block 310, which in turn may be operatively connected to second N-flop synchronizer 320, which in turn may be operatively connected to second binary-to-gray converter 322. Second binary-to-gray converter 322 may also be operatively connected to write control block 308 such that data output from write control block 308 may be converted from binary code to grey code before being converted back to binary and then being fed into read control block 310 to streamline the process of transferring write pointer data from the write clock domain into the read clock domain. During this conversion process second N-flop synchronizer 320 may likewise be configured to ensure signal stability such that the write pointer signal data may be stable and synchronized with the destination read clock domain.

In some embodiments, conventional FIFO architectures may have a minimum latency of 2 to 3 clock cycles and may have a minimum depth requirement for the same clock read and write clock frequency as 6 in order to cover read pointer and write pointer round trip delay with 2 flop synchronizers. In the context of FIFO architectures, depth may refer to the number of storage locations (data slots) or the capacity of the FIFO buffer. Typically, depth may be used to indicate how many data elements the FIFO buffer may be able to hold at any given time. Most conventional FIFO architectures may experience high latency and as such may struggle to satisfy the UCIe standard target latency.

Figure 4:
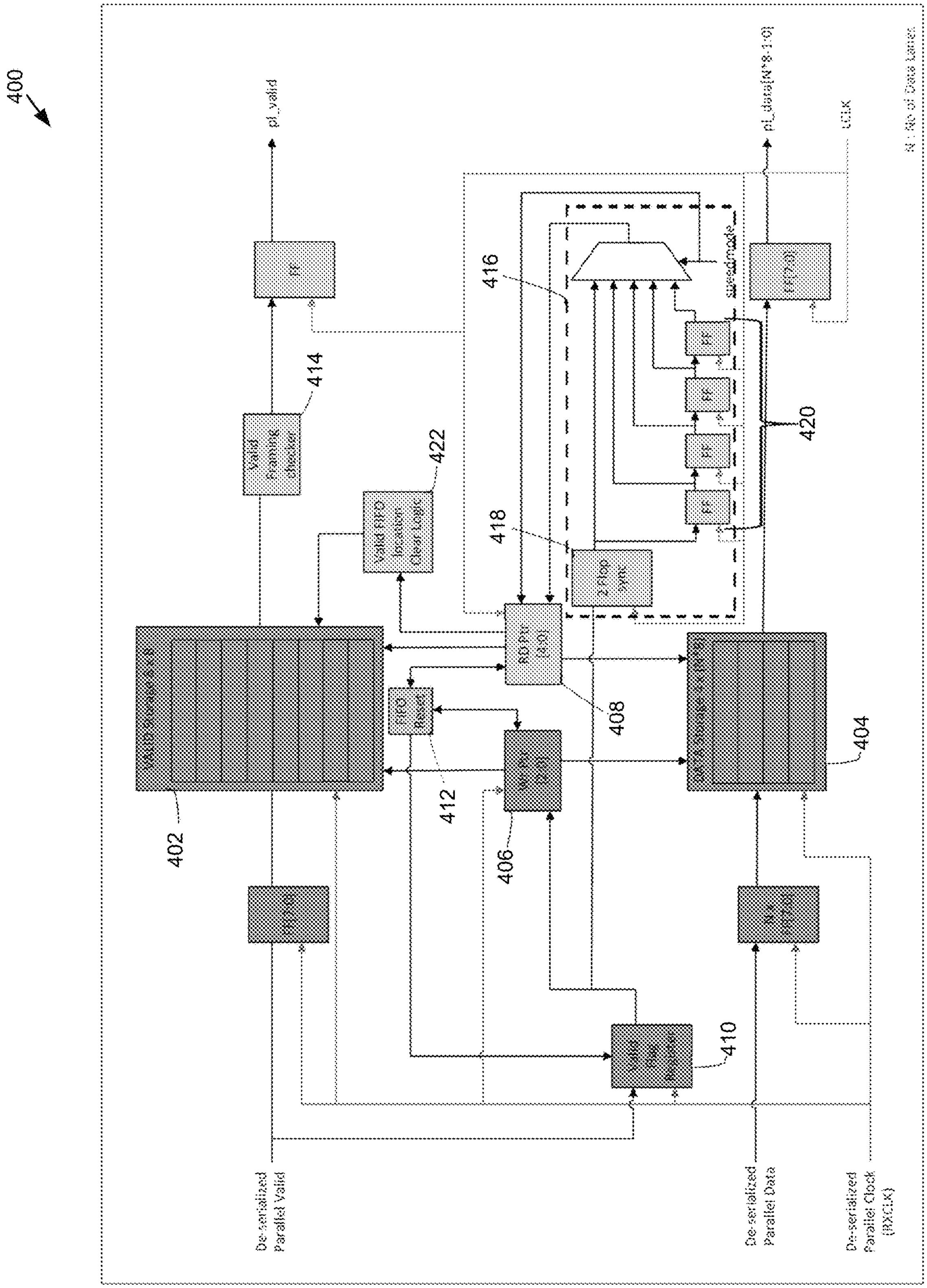
FIG. 4 shows an example of a self-clearing low latency asynchronous FIFO architecture consistent with embodiments of the present disclosure.

Referring now to FIG. 4, circuit 400 is provided showing an example of a self-clearing low latency asynchronous FIFO architecture consistent with embodiments of the present disclosure. Circuit 400 may include first FIFO storage buffer 402 and second FIFO storage buffer 404, where both first and second FIFO buffers 402, 404 may be configured to receive input signals tethered to a first clocking domain (RXCLK) on the write side of circuit 400 and both first and second FIFO buffers 402, 404 may be tethered to a second clocking domain (LCLK) on the read side of circuit 400. Additionally, first FIFO storage buffer 402 may be configured to hold a first set of data slots for valid data, and second FIFO storage buffer 404 may be configured to hold a second set of data slots for raw data. In this context, valid data may refer to data transmitted over a valid lane and raw data may refer to any data transmitted over a normal data lane. Moreover, a data lane may refer to a physical transmission path (or channel) within a receiver interface used to transfer actual data payloads between dies and a valid lane may refer to a data lane that may be actively transmitting valid data (as opposed to idle signals, errors, or no data).

Circuit 400 may further include write pointer 406 operatively connected to both first and second FIFO storage buffers 402, 404, such that both first and second FIFO buffers 402, 404 share the use of write pointer 406. Further, write pointer 406 may be configured to keep track of which data slot may be written to next in an upcoming clock cycle for both first and second FIFO storage buffers 402, 404. Circuit 400 may also include read pointer 408 operatively connected to both first and second FIFO storage buffers 402, 404. Read pointer 408 may be configured to keep track of which data slot may be read from next in a current clock cycle for both first and second FIFO storage buffers 402, 404. Circuit 400 may also include valid flag register 410 operatively connected to write pointer 406, where valid flag register 410 may be configured to trigger a start in the first clocking domain (RXCLK) when a bit (1'b1) may be sampled from the input signal and stored in first FIFO storage buffer 402. Valid flag register 410 may also be configured to increment write pointer 406 from its current location to another location in first FIFO storage buffer 402.

Additionally, circuit 400 may also include FIFO reset logic 412, frame checker logic 414, flop delay logic 416, and FIFO location clear logic 418. FIFO reset logic 412 may be operatively connected to write pointer 406, read pointer 408, and valid flag register 410, and FIFO reset logic 412 may be configured to asynchronously reset write pointer 406 and valid flag register 410, and to synchronously reset read pointer 408. Frame checker logic 414 may be operatively connected to first FIFO storage buffer 402, and frame checker logic 414 may be configured to receive an output from first FIFO storage buffer 402 and to confirm that the output from first FIFO storage buffer 402 may be valid data. In some embodiments, Valid storage read data (i.e. data output from first FIFO storage buffer 402) may go through frame checker logic 414 and this output data may be registered as pl_valid on the RDI interface. Similarly, data storage read data (i.e. data output from second FIFO storage buffer 404) may be registered as pl_data on the RDI interface. Flop delay logic 416 may be operatively connected to read pointer 408 and valid flag register 410, and flop delay logic 416 may also be configured to synchronize signals transmitted in the first clocking domain (RXCLK) with signals transmitted in the second clocking domain (LCLK). Flop delay logic 416 may further include flop synchronizer 418 and a variable number of delay stages 420 configured to vary based on current operating data rates. FIFO location clear logic 422 may be operatively connected to read pointer 408 and first FIFO storage buffer 402, and FIFO location clear logic 422 may be configured to clear each previously selected storage location in first FIFO storage buffer 402 after read pointer 408 may be incremented to another available storage location in first FIFO storage buffer 402.

In some embodiments, a UCIe adapter side interface may be defined as a receiver data interface (RDI) which may operate on the second clock domain (LCLK). De-serialized parallel data may be transferred from the first clock domain (RXCLK) which may be a de-serialized parallel clock, to the second clock domain (LCLK). The frequencies in the first clock domain (RXCLK) may change relative to the serial line data rate currently in use, whereas the frequencies in the second clock domain (LCLK) may be fixed or bandwidth matched to the highest supported data rate irrespective of operating data rate.

In some embodiments, circuit 400 may operate in a clock strobe mode, where a forwarded clock may be stopped such that the valid lane may be zero when there is no data transmission on the main band (i.e. idle state) and due to this the first clock domain (RXCLK) may be stopped and the de-serialized parallel data in the valid lane may become all zero. However, read pointer 408 may continue running because the second clock domain (LCLK) may be a continuous read clock and it may read the same location again which is not written and generates the wrong pl_valid. To overcome this problem, the valid lane location may need to be asynchronously cleared after data is read from the location. To facilitate this asynchronous clearing, the valid lane storage may have a physical depth of 8 (i.e. 8 data slots in first FIFO storage buffer 402) compared to a physical depth of 4 for data lane storage (i.e. 4 data slots in second FIFO storage buffer 404). Both valid lane and data lanes storages (i.e. first FIFO storage buffer 402 and second FIFO storage buffer 404) may use the same 3-bit write pointer (i.e. write pointer 406) to cover a physical depth of 8 data slots.

In some embodiments, for lower data rates, the second clock domain (LCLK) may be two times or even four times faster (2× or 4×) compared to the first clock domain (RXCLK) such that read pointer 408 may be selected as 5 bits of which the most significant (MSB) 3-bits may function as an effective read pointer. Correspondingly, the least significant (LSB) 2-bits may be used as a counter to count LCLK cycles and to increment the effective read pointer every 2 cycles or 4 cycles based on the data rate. For example: for a 16G data rate, a 5-bit read pointer may increment by 4 data slots at every cycle of LCLK, for an 8G data rate, a 5-bit read pointer may increment by 2 data slots at every cycle of LCLK, and for a 4G data rate, a 5 bit read pointer may increment by 1 data slot at every cycle of LCLK.

In some embodiments, a write pointer [1:0] and read pointer [3:2] may be used to address the physical location for the first FIFO storage buffer 402. Similarly, a write pointer [2:0] and read pointer [4:2] may be used to address the physical location for second FIFO storage buffer 404. FIFO write-side operations may involve writing de-serialized input data into first FIFO storage buffer 402 when valid data may be received, and the de-serialized parallel valid input data's LSB may be used to qualify the data.

In some embodiments, valid flag register 410 may be set when a qualified valid bit is sampled as 1 using first clock domain (RXCLK) and may remain set until it is cleared by asynchronous FIFO reset logic 412. Valid flag register 410 may be used to increment write pointer 406 in the first clock domain (RXCLK). This signal transmitted by valid flag register 410 may be synchronized to the second clock domain (LCLK) by using 2-flop synchronizers followed by selectable 4 delay stages and it may be used to increment a 5-bit read pointer (i.e. read pointer 408). The number of delay stages may be selected based on operating data rates in use to ensure that second FIFO storage buffer 404 may always have at least one stable data slot to read from. For example, for a data rate of 16 Gbps, 0 delay stages may be used, for a data rate of 8 Gbps, 1 delay stage may be used, and for a data rate of 4 Gbps, 3 delay stages may be used. The last delay stage may be added for future use or to handle drift in the second clock domain (LCLK).

Figure 5:
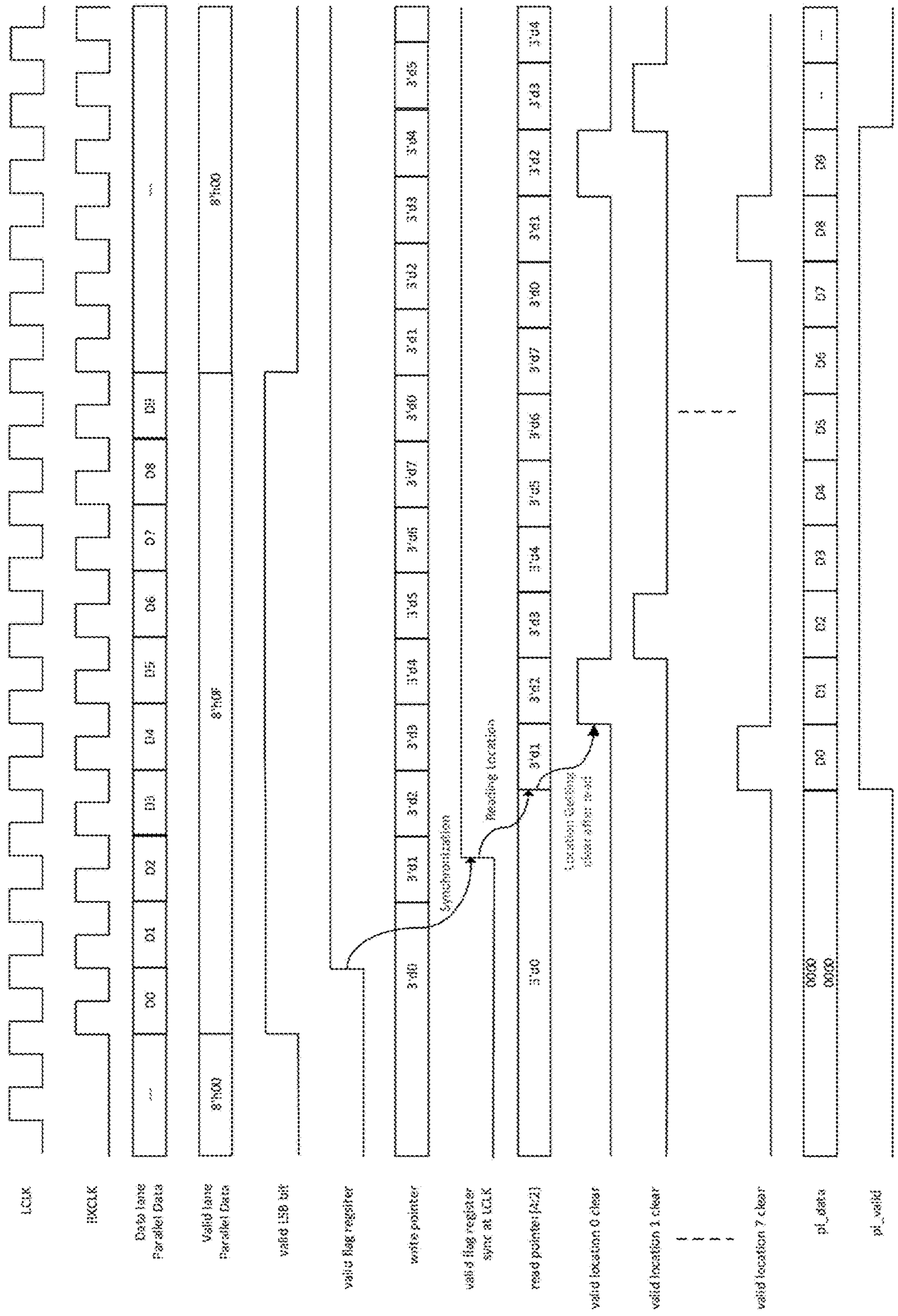
FIG. 5 shows an example of a timing diagram for a valid location clear logic component consistent with embodiments of the present disclosure.

Referring now to FIG. 5, timing diagram 500 is provided showing an example of a valid location clear logic component consistent with embodiments of the present disclosure. Timing diagram 500 may illustrate how the valid location asynchronous clearing logic may be used in the clock strobe mode to avoid generating the wrong pl_valid after the serial clock is stopped. When the read pointer may be moved to the next location (e.g. 3'd0 to 3'd1), in the next cycle the previous location (e.g. 3'd0) data may be cleared using asynchronous reset (e.g. valid location 0 clear) and this process may be continuous, such that when the read pointer reaches the same location which may not be written to because the first clock domain (RXCLK) is stopped. Instead, the read pointer may read the data slot on the first FIFO storage buffer (i.e. valid storage location data) as all zeros and make pl_valid low. To stop the read pointer increment when write clock (RXCLK) may be stopped, a grey-coded write pointer may be synchronized to read clock (LCLK) and converted back to binary.

Figure 6:
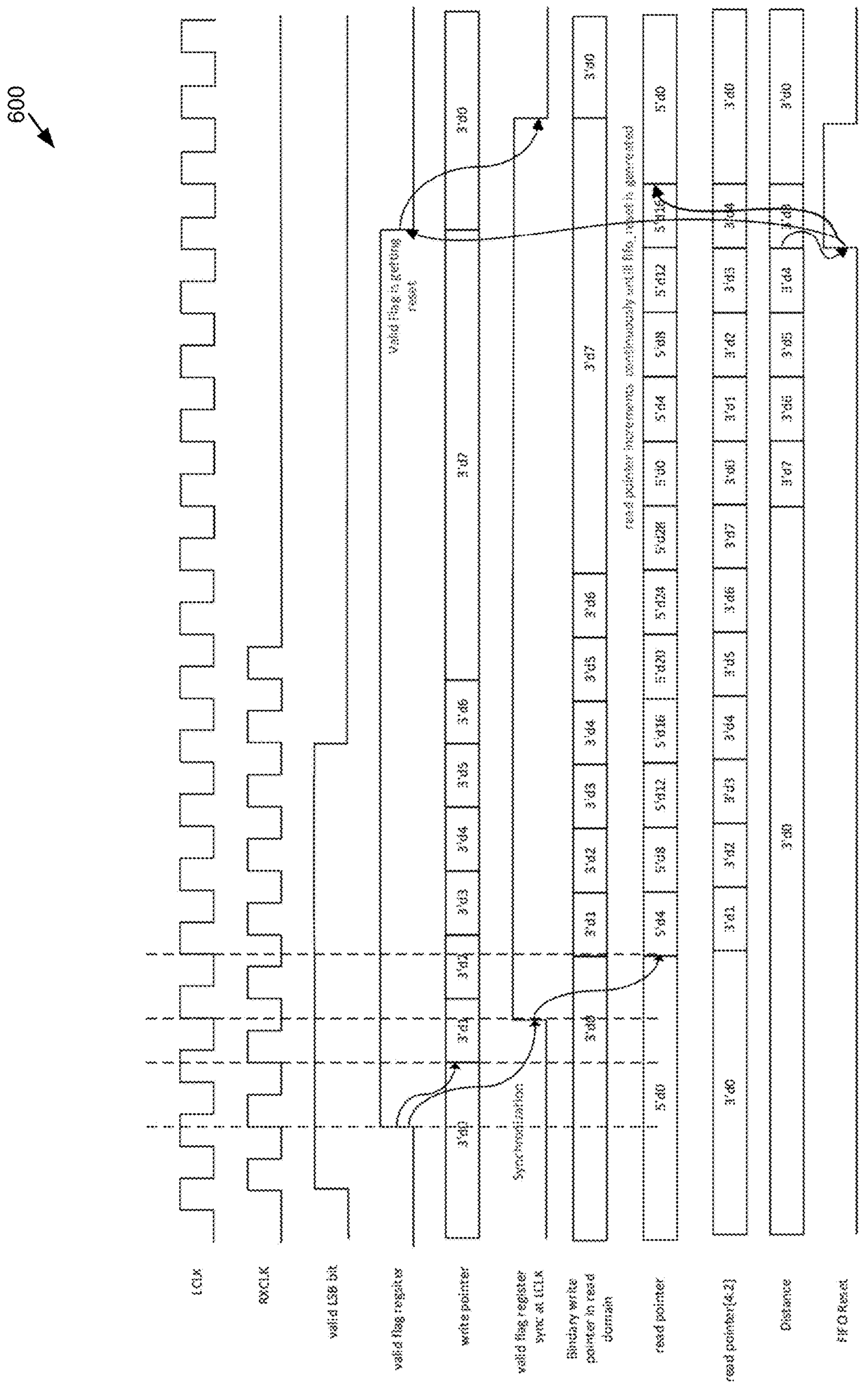
FIG. 6 shows an example of a timing diagram for a FIFO reset logic component consistent with embodiments of the present disclosure.

Referring now to FIG. 6, timing diagram 600 is provided showing an example of a FIFO reset logic component consistent with embodiments of the present disclosure. Timing diagram 600 may illustrate how the distance (number of cycles) between the read pointer and the synchronized write pointer may be calculated, and that if this distance is more than 4 cycles, then the write pointer may not continue incrementing. In this scenario, the FIFO reset logic may be used to clear the valid flag register and the write pointer asynchronously as shown in timing diagram 600. The same FIFO reset logic may also be used to clear the read pointer (LCLK domain) synchronously. Using this method, data may be transferred from a write clock domain to a read clock domain with 1 to 2 clock cycle latency while requiring less physical depth in the data storage.

Figure 7:
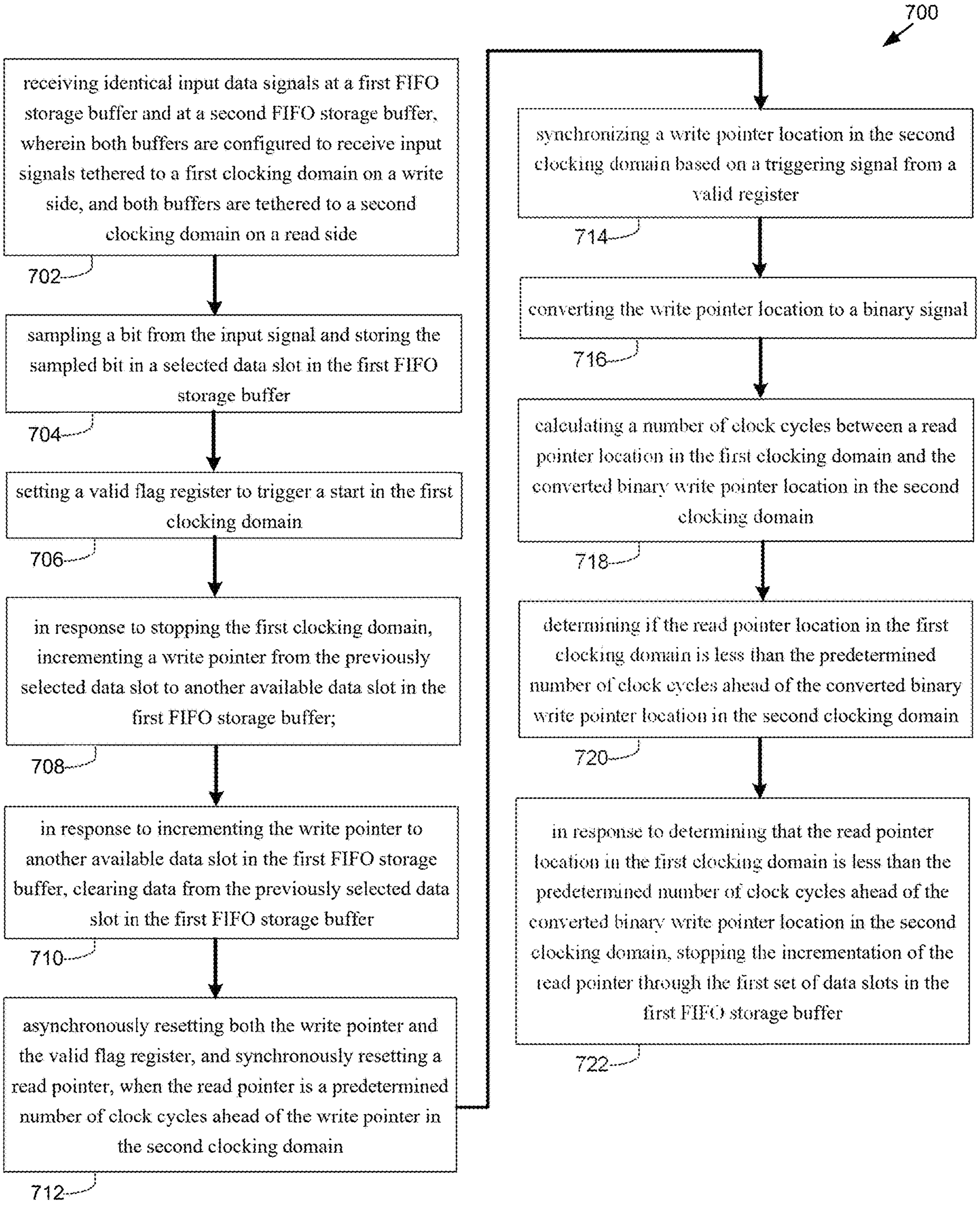
FIG. 7 shows a flowchart illustrating a method for performing asynchronous self-clearing FIFO storage buffers in a receiver circuit consistent with embodiments of the present disclosure.

Referring now to FIG. 7, flowchart 700 is provided showing a method for performing asynchronous self-clearing FIFO storage buffers in a receiver circuit consistent with embodiments of the present disclosure. According to flowchart, 700 the method may begin by receiving (702) identical input data signals at a first FIFO storage buffer and at a second FIFO storage buffer, wherein both the first FIFO storage buffer and the second FIFO storage buffer may be configured to receive input signals tethered to a first clocking domain on a write side, and wherein both the first FIFO storage buffer and the second FIFO storage buffer may be tethered to a second clocking domain on a read side. The method may further include setting (706) a valid flag register to trigger a start in the first clocking domain, then in response to stopping the first clocking domain, incrementing (708) a write pointer from the previously selected data slot to another available data slot in the first FIFO storage buffer, and in response to incrementing the write pointer to another available data slot in the first FIFO storage buffer, clearing (710) data from the previously selected data slot in the first FIFO storage buffer. The method may also include asynchronously resetting (712) both the write pointer and the valid flag register, and synchronously resetting a read pointer, when a read pointer is a predetermined number of clock cycles ahead of the write pointer in the second clocking domain, synchronizing (714) a write pointer location in the second clocking domain based on a triggering signal from a valid register, and converting (716) the write pointer location to a binary signal. The method may also include calculating (718) a number of clock cycles between a read pointer location in the first clocking domain and the converted binary write pointer location in the second clocking domain, determining (720) if the read pointer location in the first clocking domain is less than the predetermined number of clock cycles ahead of the converted binary write pointer location in the second clocking domain, and in response to determining that the read pointer location in the first clocking domain is less than the predetermined number of clock cycles ahead of the converted binary write pointer location in the second clocking domain, stopping (722) the incrementation of the read pointer through the first set of data slots in the first FIFO storage buffer.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A self-clearing first-in-first-out (FIFO) receiver circuit, comprising:

- a first FIFO storage buffer and a second FIFO storage buffer are both configured to receive input signals tethered to a first clocking domain on a write side, wherein both the first FIFO storage buffer and the second FIFO storage buffer are tethered to a second clocking domain on a read side;
- a write pointer operatively connected to both the first and second FIFO storage buffers;
- a read pointer operatively connected to both the first and second FIFO storage buffers;
- a valid flag register configured to trigger a start in the first clocking domain when a bit is sampled and stored in the first FIFO storage buffer; and
- a FIFO reset logic configured to asynchronously reset both the write pointer and the valid flag register, and to synchronously reset the read pointer.

2. The self-clearing FIFO receiver circuit of claim 1, wherein the write pointer is configured to keep track of which data slot is to be written to, within an upcoming clock cycle for both the first and second FIFO storage buffers.

3. The self-clearing FIFO receiver circuit of claim 1, wherein the read pointer is configured to keep track of which data slot is to be read from, within a current clock cycle for both the first and second FIFO storage buffers.

4. The self-clearing FIFO receiver circuit of claim 1, wherein the first FIFO storage buffer is configured to hold a first set of data slots for valid data, and the second FIFO storage buffer is configured to hold a second set of data slots for raw data.

5. The self-clearing FIFO receiver circuit of claim 4, wherein the number of data slots held in the first set of data slots for the first FIFO storage buffer is greater than the number of data slots held in the second set of data slots for the second FIFO storage buffer.

6. The self-clearing FIFO receiver circuit of claim 4, wherein the valid flag register is configured to increment the write pointer to an available data slot in the first FIFO storage buffer.

7. The self-clearing FIFO receiver circuit of claim 1, further including:

- a frame checker logic configured to receive an output from the first FIFO storage buffer and to confirm that the output from the first FIFO storage buffer is valid data.

8. The self-clearing FIFO receiver circuit of claim 1, further including:

- a flop delay logic configured to synchronize signals transmitted in the first clocking domain with signals transmitted in the second clocking domain.

9. The self-clearing FIFO receiver circuit of claim 8, wherein flop delay logic includes a flop synchronizer and a variable number of delay stages configured to vary based on current operating data rates.

10. The self-clearing FIFO receiver circuit of claim 9, wherein the number of delay stages is varied so that both the first and second FIFO storage buffers have at least one data slot available to read/write.

11. The self-clearing FIFO receiver circuit of claim 8, wherein the flop delay logic is configured to increment the read pointer from a previously selected data slot in the first FIFO storage buffer to another available data slot in the first FIFO storage buffer.

12. The self-clearing FIFO receiver circuit of claim 4, wherein the first FIFO storage buffer is configured to selectively operate in a clock strobe mode, wherein when operating in clock strobe mode the first clocking domain is selectively stopped such that no data is transmitted and the write pointer is not incremented in the first FIFO storage buffer, while in the second clocking domain data continues to be transmitted and both the read pointer and the write pointer continue to increment through data slots in the second FIFO storage buffer.

13. The self-clearing FIFO receiver circuit of claim 12, further including:

a FIFO location clear logic configured to clear each previously selected data slot in the first FIFO storage buffer after the read pointer is incremented to another available data slot in the first FIFO storage buffer.

14. The self-clearing FIFO receiver circuit of claim 13, wherein the FIFO location clear logic is only enabled while the first FIFO storage buffer is operating in the clock strobe mode.

15. A method for self-clearing first-in-first-out (FIFO) storage buffers in a receiver circuit, the method comprising:

receiving identical input data signals at a first FIFO storage buffer and at a second FIFO storage buffer, wherein both the first FIFO storage buffer and the second FIFO storage buffer are configured to receive input signals tethered to a first clocking domain on a write side, and wherein both the first FIFO storage buffer and the second FIFO storage buffer are tethered to a second clocking domain on a read side;

sampling a bit from the input signal and storing the sampled bit in a selected data slot in the first FIFO storage buffer;

setting a valid flag register to trigger a start in the first clocking domain;

incrementing a write pointer from the previously selected data slot to another available data slot in the first FIFO storage buffer;

clearing data from the previously selected data slot in the first FIFO storage buffer; and asynchronously resetting both the write pointer and the valid flag register, and synchronously resetting a read pointer, when the read pointer is a predetermined number of clock cycles ahead of the write pointer in the second clocking domain.

16. The method of claim 15, wherein the first FIFO storage buffer is configured to hold a first set of data slots for valid data, and the second FIFO storage buffer is configured to hold a second set of data slots for raw data.

17. The method of claim 15, wherein no data is transmitted and the write pointer is not incremented in the first FIFO storage buffer when the first clocking domain is stopped.

18. The method of claim 15, wherein a read pointer is configured to increment through the first set of data slots in the first FIFO storage buffer until the read pointer is less than the predetermined number of clock cycles ahead of the write pointer in the second clocking domain.

19. The method of claim 18, wherein a FIFO location clear logic is configured to clear each previously selected data slot in the first FIFO storage buffer after the read pointer is incremented to another available data slot in the first FIFO storage buffer.

* * * * *